United States Patent
Aufrere et al.

(10) Patent No.: US 8,052,195 B2
(45) Date of Patent: Nov. 8, 2011

(54) DEVICE FOR ENERGY ABSORPTION UPON IMPACT FOR AN AUTOMOTIVE SEAT

(75) Inventors: Christophe Aufrere, Montlhery (FR); Ho-Sung Kang, Langueux (FR); Julien Meghira, Villejuif (FR)

(73) Assignee: Faurecia Sieges d'Automobile, Nanterre (FR)

( * ) Notice: Subject to any disclaimer, the term of this patent is extended or adjusted under 35 U.S.C. 154(b) by 355 days.

(21) Appl. No.: 12/376,746

(22) PCT Filed: Aug. 9, 2007

(86) PCT No.: PCT/FR2007/051806
§ 371 (c)(1),
(2), (4) Date: Apr. 6, 2009

(87) PCT Pub. No.: WO2008/017794
PCT Pub. Date: Feb. 14, 2008

(65) Prior Publication Data
US 2010/0176621 A1   Jul. 15, 2010

(30) Foreign Application Priority Data
Aug. 11, 2006 (FR) .................... 06 07307

(51) Int. Cl.
*B60J 7/00* (2006.01)
*B60N 2/427* (2006.01)
(52) U.S. Cl. ............... 296/68.1; 296/65.13; 296/65.16; 297/216.1; 188/376
(58) Field of Classification Search ............ 296/187.03, 296/68.1, 65.13, 65.01, 65.16, 65.09; 297/216.1, 297/216.13, 216.14; 188/376
See application file for complete search history.

(56) References Cited

U.S. PATENT DOCUMENTS 5,234,189 A * 8/1993 Myers .................... 248/429
7,992,934 B2 * 8/2011 Cailleteau ............ 297/216.14

FOREIGN PATENT DOCUMENTS

| DE | 196 13 506 | 10/1997 |
| DE | 198 07 581 | 9/1998 |
| DE | 198 31 218 | 1/2000 |
| EP | 0 709 249 | 5/1996 |
| EP | 1 547 857 | 6/2005 |

OTHER PUBLICATIONS

International Search Report and Written Opinion from counterpart application No. PCT/US2007/051806; Report dated Feb. 5, 2008.
French Preliminary Search Report and Written Opinion from French priority patent application No. FR 0607307; report dated Mar. 15, 2007.

* cited by examiner

*Primary Examiner* — Joseph Pape
(74) *Attorney, Agent, or Firm* — Miller, Matthias & Hull, LLP

(57) ABSTRACT

Device for energy absorption in particular for an automotive vehicle seat upon impact, said device comprising a first element substantially in the form of a plate with a hole and a second element inserted in the hole, said first element comprising a series of cutouts that are successive along a deformation direction and define a series of yokes between each other extending along a direction of elongation transversal to the direction of deformation, said yokes having each a length along the direction of elongation, said length increases strictly from one yoke to the next according to the distance of the yokes in relation to the second element and the yokes having an overall concavity turned towards the second element.

15 Claims, 3 Drawing Sheets

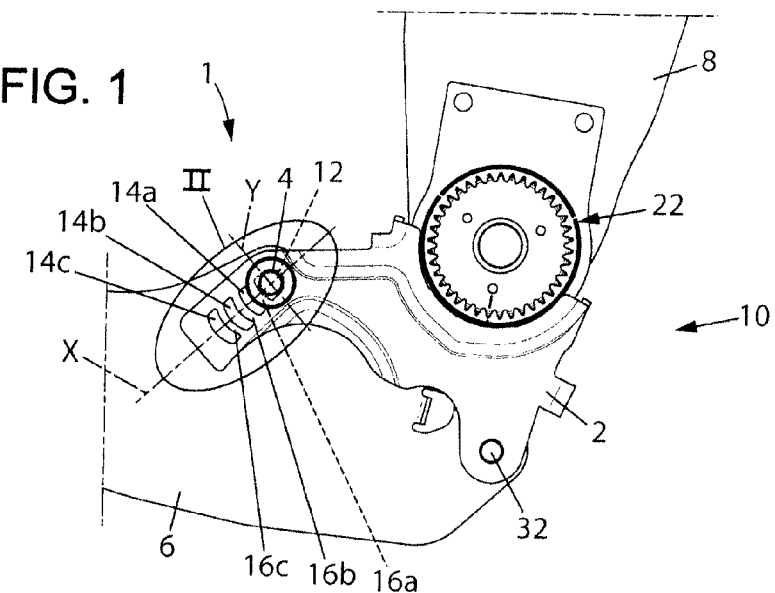
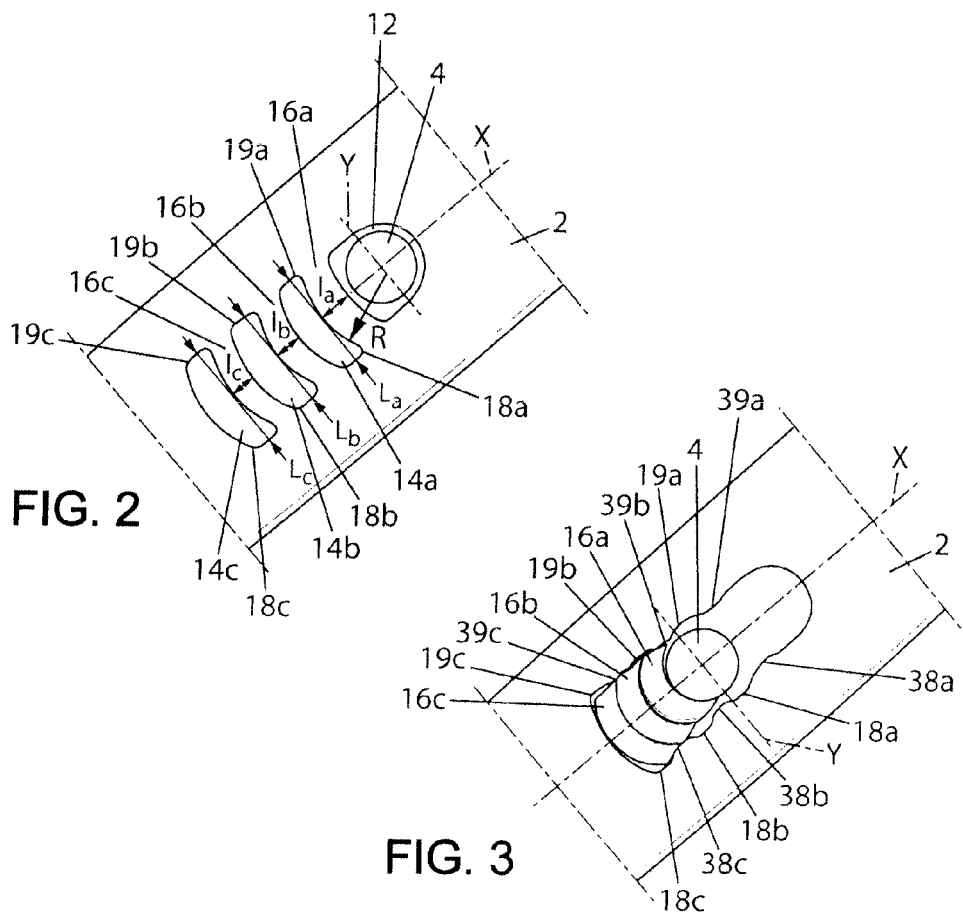

DEVICE FOR ENERGY ABSORPTION UPON IMPACT FOR AN AUTOMOTIVE SEAT

CROSS-REFERENCE TO RELATED APPLICATIONS

This application is a U.S. national stage filing of International Patent Application No. PCT/FR2007/051806 filed on Aug. 9, 2007, which claims priority under the Paris Convention to French Patent Application No. 06 07307, filed on Aug. 11, 2006.

FIELD OF THE DISCLOSURE

The invention relates to a device for absorbing energy in the event of an impact, particularly for a motor vehicle seat. The invention further relates to a seat and to a vehicle comprising the energy absorbing device.

BACKGROUND OF THE DISCLOSURE

A device such as this is designed to reduce the stresses applied to the occupant of the vehicle sitting on the seat by progressively absorbing the kinetic energy to which his body is subjected. The invention is more particularly intended to absorb energy in the event of a rear impact, but can also be applied to a frontal impact or even to other types of impact.

Documents DE-196 13 506 and DE-198 07 581 each describe an energy absorbing device of the aforementioned type comprising a first element substantially in the form of a (shaped) plate that has a hole and a second element inserted in the hole, said first element comprising a succession of cutouts that succeed one another in a direction of deformation and between them define a succession of bridges (strips) extending in a direction of elongation transverse to the direction of deformation, said cutouts each having a length in the direction of elongation.

SUMMARY OF THE DISCLOSURE

The invention is aimed at improving the energy absorption afforded by such a device.

To do this, according to the invention, said length increases strictly from one cutout to the next as a function of the distance of the bridges from the second element and the bridges on the whole have a concave side facing toward the second element In this way the influence that the friction (usually likened to a pipe-clearing action) of a broken bridge against the edge of the cutouts has on the resistive force offered by the device is reduced, thus reducing variations and uncertainties regarding the resistive force offered by the device. The increase in length reduces the friction force and a concave shape prevents the broken bridges from exhibiting a bracing effect. As the resistive force is better controlled and more constant it can thus be tailored to suit the biomechanical strength characteristics of the human body in order to increase the absorption of energy without causing injury to the occupant of the seat.

According to another feature according to the invention, each of the bridges is advantageously substantially in the shape of a circular arc of a width that remains substantially constant over most of its length with a concave side facing toward the second element.

Thus, the forces exerted on the bridges are essentially stretching forces with only a small amount of shear. The variations in the resistive force offered by the device in the course of the impact are thus further reduced.

According to an additional feature in accordance with the invention, the ratio between the radius of curvature and the length of the bridges advantageously ranges between 0.75 and 4.

This range of values provides the best results in terms of the constancy of the resistive force during the course of the impact.

According to another feature in accordance with the invention, the difference in length between two successive cutouts advantageously ranges between 0.25 millimeter and 2 millimeters.

This range of values makes it possible to reduce the friction of the broken bridges while at the same time maintaining a force that is substantially constant from one bridge to the next and keeping the device to a reasonable size.

According to another feature in accordance with the invention, the number of bridges advantageously ranges between 3 and 8.

This range of values allows sufficient relative movement between the first and second element that the impact can be deadened (absorbed), while at the same time limiting the movement of the occupant of the seat.

According to another feature in accordance with the invention, the various bridges in the succession advantageously have substantially the same width in the direction of deformation.

Thus, the resistive force offered by each of the bridges is substantially constant and, because the broken bridges offer practically no resistive force, the resistive force of the device is substantially constant.

According to another feature in accordance with the invention, the second element advantageously comes into contact with the bridges over a substantially flat (blunt) surface.

Thus, the bridges have even more of a tendency to be made to stretch and to break at their ends than to break at the point of contact with the second element. The constancy of the resistive force is thus even better.

According to an additional feature in accordance with the invention, the second element advantageously has a circular section.

A section such as this allows the entire bridge to be loaded fairly uniformly in order to apply to it a stretching stress that is relatively uniform over most of its length.

According to another feature in accordance with the invention, the cutouts are advantageously delimited in the direction of deformation by the bridges and in the direction of elongation by longitudinal edges that are substantially straight and aligned with one another.

The rupture zone of the bridges is thus better controlled and the friction phenomenon further reduced.

According to another feature in accordance with the invention, the first element advantageously consists of a roll-formed (laminated) plate of which the direction of rolling is substantially parallel to the direction of elongation.

Thus, the forces applied to the first element are stretching forces in a direction in which it has the best mechanical strength properties.

According to another feature in accordance with the invention, the energy absorbing device advantageously comprises two successions of cutouts succeeding one another in the direction of deformation and each of them defining a succession of bridges on each side of the hole.

Thus, the device is able to absorb energy in the event of an impact in both directions, particularly in the event of a rear impact and in the event of a frontal impact.

The invention also relates to a seat. According to the invention, the seat advantageously comprises, in addition to said energy absorbing device, a seat cushion structure and a backrest structure, and the seat advantageously has the following features:

the first element is fixed to one of either the seat cushion structure or the backrest structure, and the first element is held on the other of either the seat cushion structure or the backrest structure by means of a rotational joint, and the second element is secured to the other of either the seat cushion structure or the backrest structure.

Thus, in the event of a rear impact, the kinetic energy of the occupant of the seat is progressively absorbed by allowing the backrest to pivot slightly backward in order to limit the stress experienced by the passenger's back against the seat backrest.

The invention further relates to a vehicle. According to the invention, the vehicle comprises, advantageously in addition to said energy absorbing device, a chassis and a seat comprising a fastening base. Furthermore, the second element is fixed to the chassis of the vehicle and the first element is secured to the seat fastening base.

Thus, in the event of a frontal or rear impact, the kinetic energy of the occupant of the seat is progressively absorbed by allowing the seat to move forward or backward slightly in order to limit the stress applied to the passenger's body.

According to an additional feature in accordance with the invention, the vehicle advantageously comprises a slideway, said slideway comprising a fixed profile section and a mobile profile section able to slide one relative to the other in the direction of deformation, in which vehicle the first element consists of the fixed profile section of the slideway.

This simple solution does not entail any additional parts for implementing the invention.

According to an alternative feature in accordance with the invention, the vehicle comprises a slideway, said slideway comprising a fixed profile section and a mobile profile section, in which vehicle the first element is welded to the fixed profile section of the slideway.

This solution allows the invention to be implemented without the need to modify the existing parts.

BRIEF DESCRIPTION OF THE DRAWINGS

Other particulars and advantages of the present invention will become apparent in the following description of nonlimiting exemplary embodiments, with reference to the attached drawings in which:

FIG. 1 illustrates a seat comprising a first embodiment of a device for absorbing energy, in rotation, according to the invention, FIG. 2 illustrates, on a larger scale, the detail labeled II of the energy absorbing device of FIG. 1, before an impact, FIG. 3 illustrates, in accordance with FIG. 2, the detail labeled II, after an impact.

DETAILED DESCRIPTION OF THE DISCLOSURE

Figure 4:
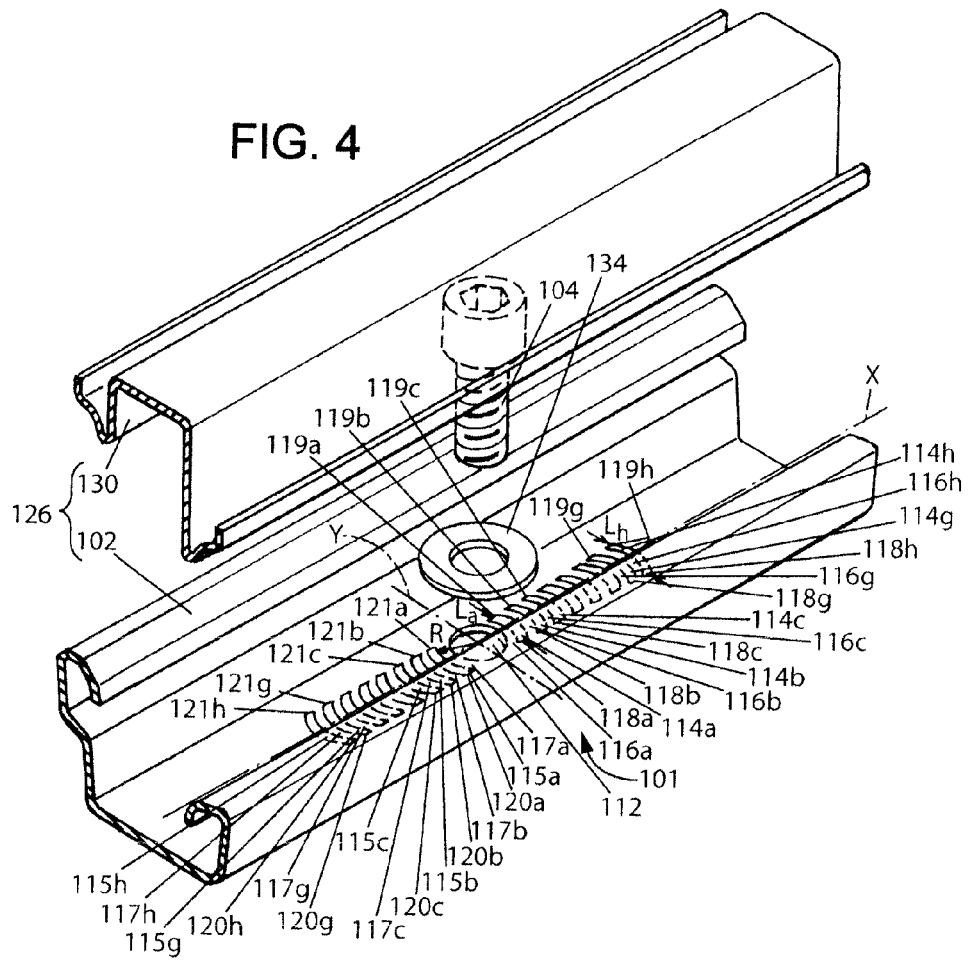
FIG. 4 illustrates an exploded perspective view of a vehicle comprising a second embodiment of a device for absorbing energy, in translation, according to the invention.

FIG. 1 illustrates a motor vehicle seat 10 essentially comprising a seat cushion structure 6, a backrest structure 8, a rotational joint device 22 and an energy absorbing device 1.

The rotational joint device 22 is interposed between the energy absorbing device, more specifically an adapter 2, and the backrest structure 8. It can be used to adjust the inclination of the backrest structure 8 with respect to the seat cushion structure 6. As it is well known per se, and in particular of the type of joint with steps or a continuous type of joint, the rotational joint device 22 will not be detailed further.

The energy absorbing device 1 comprises the adapter 2 held on the seat cushion structure by means of a pivot 32 and of a fastening screw 4 screwed into the seat cushion structure 6. It is able to absorb the energy of the occupant of the seat 10 in the event of an impact by allowing a controlled rotation of the backrest structure 8 with respect to the seat cushion structure 6 through controlled deformation of the adapter 2.

The adapter 2 consists of a shaped plate of substantially constant thickness. It has a hole 12 and a succession of cutouts 14a, 14b, 14c, in the example illustrated it has three cutouts, succeeding one another in a direction of deformation X. The direction of deformation X runs substantially circumferentially with respect to the pivot 32, with a slight deviation owing to an intended overall deformation of the adapter 2.

The cutouts 14a, 14b, 14c between them define bridges 16a, 16b, 16c, of which there are also three in the example illustrated. The bridges 16a, 16b, 16c are substantially in the shape of a circular arc with a substantially constant radius of curvature R. They have a width $l_a$, $l_b$, $l_c$ in the direction of deformation X which is substantially constant over their entire length. The bridge 16a located closest to the shank of the fastening screw 4 may, however, be slightly wider at its middle than at its ends.

The cutouts 14a, 14b, 14c are delimited in the direction of deformation X by the bridges 16a, 16b, 16c and are each delimited, in a direction of elongation Y transverse to the direction of deformation X, by two respective longitudinal edges 18a, 19a; 18b, 19b; 18c, 19c. The longitudinal edges are substantially straight and define two series 18a, 18b, 18c; 19a, 19b, 19c of longitudinal edges corresponding to each of the short sides of the cutouts. The longitudinal edges of each of these series run substantially parallel to and in the continuation of one another. The adapter 2 thus has a zone substantially in the shape of a ladder with uprights converging toward the hole, of which the rungs are formed by the bridges and the uprights by the longitudinal edges.

The cutouts 14a, 14b, 14c have, between said longitudinal edges 18a, 19a; 18b, 19b; 18c, 19c a respective length $L_a$, $L_b$, $L_c$ that increases as a function of the distance (separation) of the cutout from the hole 12 and from the shank of the fastening screw 4. Advantageously, the variation in length from one cutout to the next ranges between 0.25 millimeter and 2 millimeters, and more preferably is of the order of 1 millimeter. In the example illustrated, the lengths $L_a$, $L_b$, $L_c$ are respectively equal to 14, 15 and 16 millimeters and the hole 12 measures 13 millimeters in the direction of elongation Y.

In the event of the vehicle experiencing a rear impact, the occupant of the seat 10 exerts a very high pressure on the backrest structure 8 of the seat, which tends to cause the adapter 2 to pivot about the pivot 32 and to bring the bridge 16a against the shank of the fastening screw 4. The pressure exerted by the fastening screw 4 via a washer that compresses the adapter 2 between the seat cushion structure 6 and the head of the fastening screw 4 generates friction that opposes the rotational movement of the adapter 2 with respect to the fastening screw 4 and with respect to the seat cushion structure 6.

When this friction is insufficient, the shank of the fastening screw applies a force to the first bridge 16a tending to deform the bridge in the direction of deformation X and to stretch it in the direction of elongation Y. If the force applied to the first bridge 16a exceeds the mechanical strength of the material of which the adapter 2 is made then the bridge 16a breaks along irregular breakage edges 38a, 39a in the continuation of the hole 17 and which are extended substantially by the longitudinal edges 18a, 19a respectively. However, the longitudinal edges 18a, 19a are set back slightly (further separated from one another) with respect to the breakage edges 38a, 38b which means that the bridge 16a is not subjected to very much friction against the longitudinal edges 18a, 19a, especially when the bridge 16a is in the shape of a circular arc the deflection of which is directed in the direction of travel of the bridge in the direction of deformation X.

Thereafter, the shank of the fastening screw 4 exerts a force on the second bridge 16b, while moving away from the hole 12. The bridge 16b deforms until it breaks if the force is sufficiently high, this generating breakage edges 38b, 39b slightly further apart than the breakage edges 38a, 39a because the longitudinal edges 18b, 19b are further apart than the longitudinal edges 18a, 19a. The bridge 16a can therefore fit between the breakage edges 38a, 39a without experiencing a great deal of friction.

And so in turn the various bridges 16a, 16b, 16c break press against one another and fit between the longitudinal edges and the breakage edges.

To prevent the bridges from being ejected or from jamming after breakage, they are advantageously held between two flanks by the fastening screw 4.

Although the device has been described in conjunction with a high speed rear impact during which the bridges break and dissipate energy, it will be noted that the device is equally advantageous in elastically absorbing the energy of low-speed impacts.

Furthermore, in place of the circular section fastening screw 4 illustrated in the embodiment of FIGS. 1 to 3 it would be possible to provide an element of a different section, for example with a substantially flat face to come into contact with the bridges. However, contact with the bridges needs to be across a relatively broad area so as to encourage the bridges to break along the longitudinal edges of the cutouts.

What is more, in order to encourage ductile deformation of the material, the direction in which the plate is roll-formed is preferably arranged parallel to the direction of elongation Y.

Figure 5:
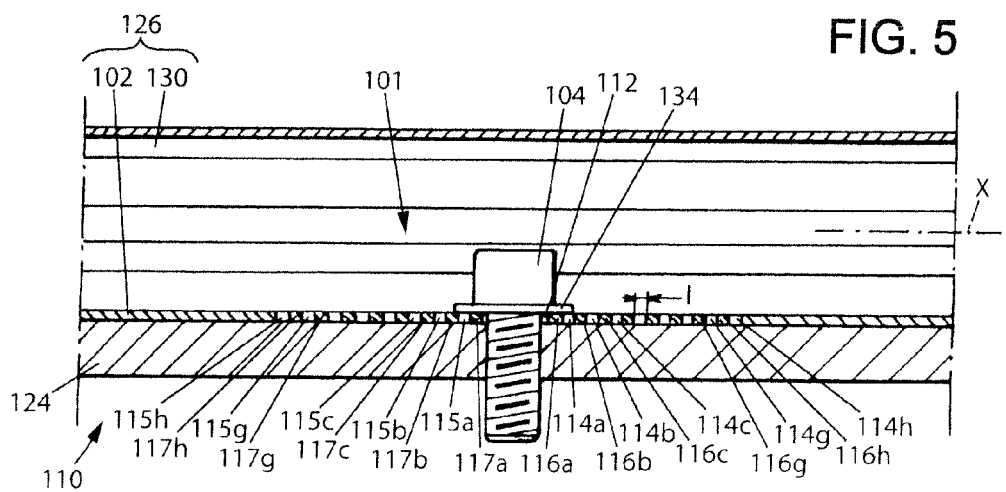
FIG. 5 is a view in central cross section of the vehicle of FIG. 4.

In the embodiment illustrated in FIGS. 4 and 5, the elements that correspond to those of the embodiment illustrated in FIGS. 1 to 3 have a reference numeral increased by 100.

FIGS. 4 and 5 illustrate a portion of a vehicle 110 equipped with an energy absorbing device 101 and essentially comprising a chassis 124 and a slideway 126 fastened to the chassis via a fastening screw 104, which slideway is intended to support a seat and in particular comprises a fixed profile section 102 and a mobile profile section 130.

The mobile profile section 130 is able to slide with respect to the fixed profile section 102 in the direction of deformation X in order to adjust the position of the seat in this direction. A locking device (not depicted) for locking the mobile profile section 130 in position with respect to the fixed profile section 102 maintains the set relative position when the vehicle is in use. Because a locking device such as this is well known per se it will not be detailed any further.

The energy absorbing device 101 is partially incorporated into the fixed profile section 102, said fixed profile section 102 consisting of a metal plate of substantially constant thickness that has been shaped and has a hole 112 and two successions of cutouts 114a, 114b, 114c, 114g, 114h; 115a, 115b, 115c, 115g, 115h extending on each side of the hole 112 substantially symmetrically; in the example illustrated, each of the successions comprises eight cutouts succeeding one another in the direction of deformation X.

The cutouts 114a, 114b, 114c, 114g, 114h; 115a, 115b, 115c, 115g, 115h between them define bridges 116a, 116b, 116c, 116g, 116h; 117a, 117b, 117c, 117g, 117h, again consisting of two successions of seven bridges. The bridges 116a, 116b, 116c, 116g, 116h; 117a, 117b, 117c, 117g, 117h are substantially in the shape of a circular arc of substantially constant radius of curvature R. They have a width l in the direction of deformation X which is substantially constant along their entire length. The bridges 116a, 117a situated closest to the shank of the fastening screw 104 in each of these successions may, however, have a width that is greater in the middle than at their ends.

The cutouts 114a, 114b, 114c, 114g, 114h; 115a, 115b, 115c, 115g, 115h are delimited in the direction of deformation X by the bridges 116a, 116b, 116c, 116g, 116h; 117a, 117b, 117c, 117g, 117h, and are each delimited in a direction of elongation Y transverse to the direction of deformation X by two respective longitudinal edges 118a, 119a; 118b, 119b; 118c, 119c; 118g, 119g; 118h, 119h; 120a, 121a; 120b, 121b; 120c, 121c; 120g, 121g; 120h, 121h. The longitudinal edges are substantially straight and define, for each of the successions of cutouts, two series 118a, 118b, 118c, 118g, 118h; 119a, 119b, 119c, 119g, 119h; 120a, 120b, 120c, 120g, 120h; 121a, 121b, 121c, 121g, 121h of longitudinal edges corresponding to each of the short sides of the cutouts. The longitudinal edges of each of these series run substantially parallel to and in the continuation of one another.

The cutouts 114a, 114b, 114c, 114g, 114h; 115a, 115b, 115c, 115g, 115h have, between said longitudinal edges 118a, 119a; 118b, 119b; 118c, 119c; 118g, 119g; 118h, 119h; 120a, 121a; 120b, 121b; 120c, 121c; 120g, 121g; 120h, 121h a respective length $L_a$, $L_h$ that increases as a function of the separation of the cutout from the hole 112 and from the shank of the fastening screw 104. Advantageously, the variation in length from one cutout to the next ranges between 0.25 millimeter and 2 millimeters and is preferably of the order of 1 millimeter.

In the event of the vehicle experiencing a rear impact, the occupant of the seat exerts a great deal of pressure on the seat backrest, tending to cause the fixed profile section 102 to move back relative to the chassis 124 and to bring the bridge 116a against the shank of the fastening screw 104. The pressure applied by the fastening screw 4 via a washer 134 pressing the fixed profile section 2 between the chassis 124 and the washer 134 interposed under the head of the fastening screw 104 generates friction that opposes the movement of the fixed profile section 102 with respect to the fastening screw 104 fastened to the chassis 124.

As described earlier in conjunction with the embodiment illustrated in FIGS. 1 to 3, when the impact is very violent the shank of the fastening screw 104 exerts force on the various bridges 116a, 116b, 116c, 116g, 116h in turn which are positioned forward of the hole 112, successively deforming the succession of bridges in the direction of deformation X and stretching them in the direction of elongation Y until they each in turn break. The increase in width of the cutouts 116a, 116b, 116c, 116g, 116h and the circular arc shape of the bridges 116a, 116b, 116c, 116g, 116h prevent said bridges 116a, 116b, 116c, 116g, 116h from being subjected to high levels of friction against the longitudinal edges 118a, 119a; 118b, 119b; 118c, 119c; 118g, 119g; 118h, 119h.

In the event of the vehicle experiencing a frontal impact, the occupant of the seat exerts a great deal of pressure on the structure of the seat via the seat belt, tending to cause the fixed profile section 102 to move forward relative to the chassis 124 and to bring the succession of bridges 117a, 117b, 117c, 117g, 117h situated to the rear of the hole 112 against the shank of the fastening screw 104. In a similar way to that which was described in conjunction with a rear impact, the shank of the fastening screw 104 successively breaks the number of bridges 117a, 117b, 117c, 117g, 117h needed to absorb the energy of the occupant according to the level of impact experienced.

Figure 6:
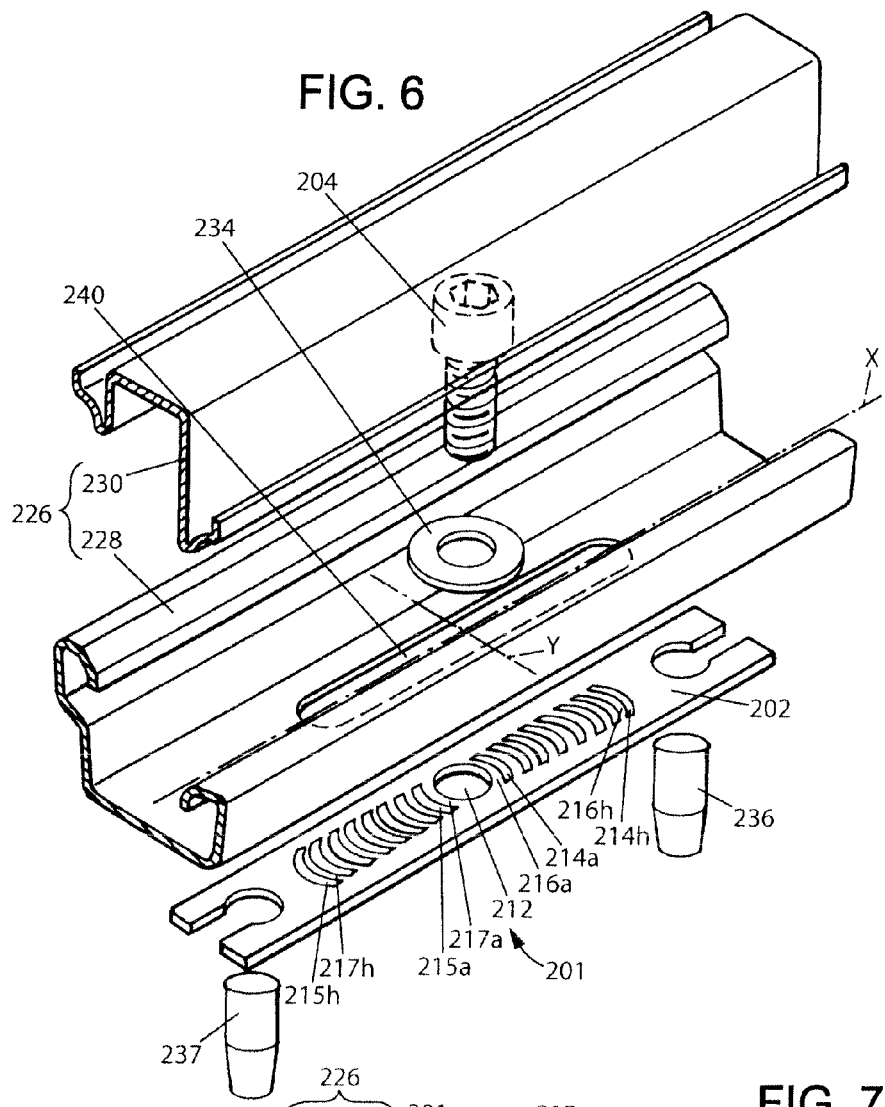
FIG. 6 is an exploded perspective illustration of a vehicle comprising a variant of the second embodiment of a device for absorbing energy, in translation, according to the invention.
Figure 7:
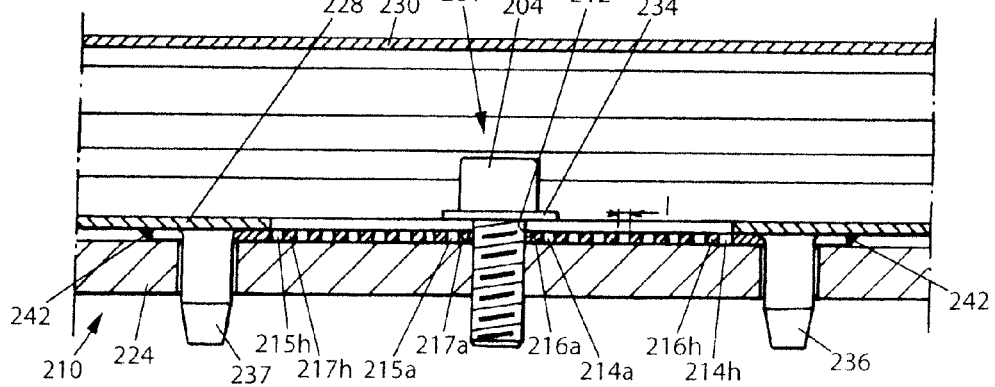
FIG. 7 is a view in central cross section of the vehicle of FIG. 6.

In the embodiment illustrated in FIGS. 6 and 7, the elements that correspond to those of the embodiment illustrated in FIGS. 4 and 5 have a reference numeral increased by 100.

FIGS. 6 and 7 illustrate an embodiment that essentially differs from the embodiment illustrated in FIGS. 4 and 5 in that the hole 212 and the successions of cutouts 214, 214h, 215a, 215h of the energy absorbing device 201 are made in a plate 202 fixed under the fixed profile section 228 of the slideway 226 by a welded seam 242.

As a result, an oblong slot 240 for the passage of the shank of the fastening screw 204 has been made in the fixed profile section 228. This oblong slot 240 runs in the direction of deformation X to allow the shank of the fastening screw 204 to move without deforming the fixed profile section 228 or applying any significant resistive force.

In addition, two fixing studs 236, 237 complete the retention of the plate 202 with respect to the chassis 224 before an impact. Slots formed in the plate 202 and the chassis 224 prevent these fastening studs 236, 237 from offering significant resistance to the relative movement of the plate 202 with respect to the shank of the fastening screw 204 and with respect to the chassis 224 to which it is fastened, while the impact is being absorbed.

Of course, the invention is not in any way restricted to the embodiments which have just been described by way of non-limiting illustration. In particular, although the embodiments illustrated in FIGS. 4 and 5 and in FIGS. 6 and 7 show two successions of cutouts positioned one on each side of the hole, in order to allow energy to be absorbed in the event of a frontal impact and in the event of a rear impact, it might be possible to provide cutouts on just one side of the hole, in order to absorb energy only for one type of impact.

The invention claimed is:

1. An energy absorbing device, for a motor vehicle seat in the event of an impact, said device comprising a first element substantially in the form of a plate that has a hole and a second element inserted in the hole, said first element comprising a succession of cutouts that succeed one another in a direction of deformation and between them define a succession of bridges extending in a direction of elongation transverse to the direction of deformation, said cutouts each having a length in the direction of elongation,
wherein said length increases strictly from one cutout to the next as a function of the distance of the cutouts from the second element and the bridges on the whole have a concave side facing toward the second element.

2. The energy absorbing device as claimed in claim 1, in which each of the bridges is substantially in the shape of a circular arc of a width that remains substantially constant over most of its length with a concave side facing toward the second element.

3. The energy absorbing device as claimed in claim 2, in which the ratio between the radius of curvature and the length of the bridges ranges between 0.75 and 4.

4. The energy absorbing device as claimed in claim 1, in which the difference in length between two successive cutouts ranges between 0.25 millimeter and 2 millimeters.

5. The energy absorbing device as claimed in claim 1, in which the number of bridges ranges between 3 and 8.

6. The energy absorbing device as claimed in claim 1, in which the various bridges in the succession have substantially the same width in the direction of deformation.

7. The energy absorbing device as claimed in claim 1, in which the second element comes into contact with the bridges over a substantially flat surface.

8. The energy absorbing device as claimed in claim 7, in which the second element has a circular section.

9. The energy absorbing device as claimed in claim 1, in which the cutouts are delimited in the direction of deformation by the bridges and in the direction of elongation longitudinal edges that are substantially straight and aligned with one another.

10. The energy absorbing device as claimed in claim 1, in which the first element consists of a roll-formed plate of which the direction of rolling is substantially parallel to the direction of elongation.

11. The energy absorbing device as claimed in claim 1, comprising two successions of cutouts succeeding one another in the direction of deformation and each of them defining a succession of bridges on each side of the hole.

12. A seat comprising an energy absorbing device as claimed in claim 1, a seat cushion structure and a backrest structure, in which seat:
the first element is fixed to one of either the seat cushion structure or the backrest structure, and the first element is held on the other of either the seat cushion structure or the backrest structure by means of a rotational joint, and
the second element is secured to the other of either the seat cushion structure or the backrest structure.

13. A vehicle comprising an energy absorbing device as claimed in claim 1, a chassis and a seat comprising a fastening base, in which vehicle the second element is fixed to the chassis of the vehicle and the first element is secured to the seat fastening base.

14. The vehicle as claimed in claim 13, comprising a slideway, said slideway comprising a fixed profile section and a mobile profile section able to slide one relative to the other in the direction of deformation, in which vehicle the first element consists of the fixed profile section of the slideway.

15. The vehicle as claimed in claim 13, comprising a slideway, said slideway comprising a fixed profile section and a mobile profile section, in which vehicle the first element is welded to the fixed profile section of the slideway.

* * * * *